Patented Nov. 6, 1928.

1,690,786

UNITED STATES PATENT OFFICE.

ALBERT JOB, OF ELBERFELD, GERMANY, ASSIGNOR TO GRASSELLI DYESTUFF CORPORATION, OF NEW YORK, N. Y., A CORPORATION OF DELAWARE.

VAT DYESTUFFS OF THE PYRIDAZINE-ANTHRAQUINONE SERIES.

No Drawing. Application filed August 17, 1927, Serial No 213,697, and in Germany August 25, 1926.

The present invention relates to new vat dyestuffs of the pyridazine anthraquinone series and to a process of preparing them. More particularly it relates to the compounds of the general formula:

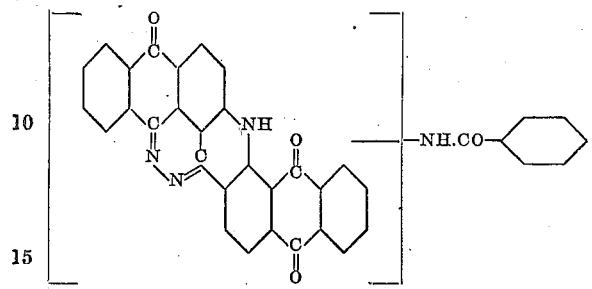

wherein the organic nuclei may be substituted.

I have found that by causing a benzoylaminodiphthaloylacridone, the manufacture of which is described in U. S. application Ser. No. 193,722, filed May 23, 1927, to be acted upon by hydrazine preferably in the presence of an organic solvent and at an elevated temperature, new vat dyestuffs are obtained, which dye cotton in clear, fast and extraordinarily powerful green shades.

I wish to be understood that the term "a benzoylaminodiphthaloylacridone" is intended to comprise the derivatives of the benzoylaminodiphthaloylacridone especially such as are substituted in the benzoyl group.

The new products generally form in the dry state dark colored crystals, being almost insoluble in organic solvents, soluble in concentrated sulfuric acid with a red violet coloration and dyeing cotton from the vat green fast shades.

The following examples serve to illustrate my invention, all parts being by weigth:—

*Example 1.*—To the suspension of 1 part of mono-benzoylamino-1.2.5.6-diphthaloylacridone (prepared according to Example 2 of the application Ser. No. 193,722 filed on May 23, 1927) in 10 to 20 parts of pyridine or toluene, about 0.25 parts of hydrazine hydrate are added at a temperature of about 90–100° C. The mixture is heated to boiling, whereby the reaction is completed in a few minutes. When all the starting material has been reacted upon, the dark green, crystalline reaction product is filtered; the yield amounts to 80 to 90% of the theory. The new compound crystallizes in bronze-like prisms, being almost insoluble in organic solvents, dissolving only in boiling nitrobenzene sparingly with a green coloration. It is soluble in concentrated sulfuric acid with a clear reddish-violet coloration and dyes cotton from a corinth colored vat very powerful green shades of outstanding fastness properties. Most probably it corresponds to the following formula:

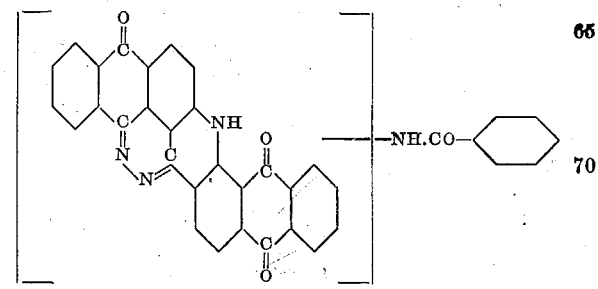

*Example 2.*—To the suspension of 1 part of monochloro-benzoyl-amino-1.2.5.6 - diphthaloylacridone (prepared according to Example 3 of application Ser. No. 193,722) in 15 parts of pyridine 0.25 parts of hydrazine hydrate are added and the mixture is treated as described in Example 1. The dyestuff thus obtained dyes cotton from the vat fast green shades. Most probably it corresponds to the following formula:

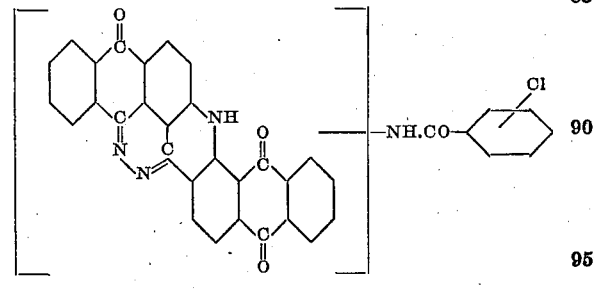

A quite similar product is obtained by suspending 1 part of mono-meta-methoxy-benzoylamino - 1.2.5.6-diphthaloyl-acridone prepared according to application Ser. No.

193,722 by treating monoamino-1.2.5.6-diphthaloylacridone with meta-methoxy-benzoylchloride in 20 parts of aniline and heating to boiling together with 0.25 parts of hydrazine hydrate.

The same vat dyestuffs as above described can also be obtained by reacting with hydrazine upon monoamino-1.2.5.6-diphthaloylacridone and treating the reacting product with aroyl-halogenides.

I claim:—

1. As new products the compounds of the general formula:

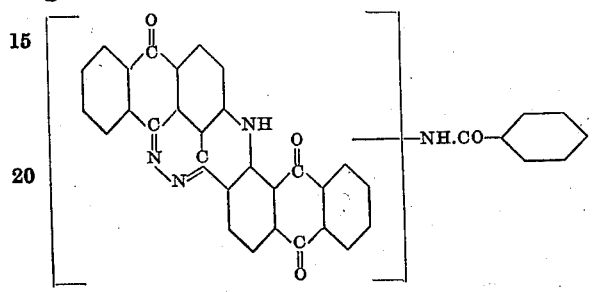

wherein the aromatic nuclei may be substituted, said products forming in the dry state dark colored crystals, soluble in concentrated sulfuric acid with a red-violet coloration, dyeing cotton from the vat green fast shades and being obtainable by causing a benzoylamino-diphthaloylacridone to be acted upon by hydrazine.

2. As a new product the compound of the most probable formula:

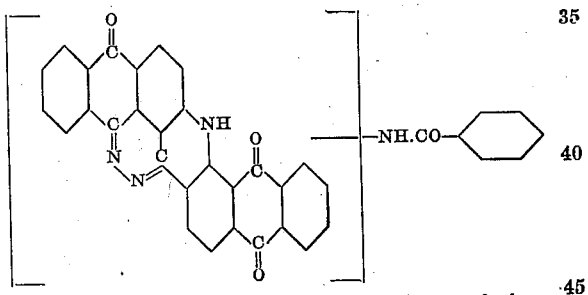

crystallizing in bronze-like prisms, being soluble in concentrated sulfuric acid with a clear reddish-violet coloration, dyeing cotton from a corinth colored vat powerful green shades of outstanding fastness properties and being obtainable by causing monobenzoylamino-1.2.5.6-diphthaloylacridone to be acted upon by hydrazine hydrate in the presence of pyridine and at a temperature of about 90 to 100° C.

3. The process of preparing green vat dyestuffs of the anthraquinone series which consists in causing a benzoylamino-diphthaloylacridone to be acted upon by hydrazine.

4. The process of preparing a green vat dyestuff of the anthraquinone series which consists in causing monobenzoyl-amino-1.2.5.6-diphthaloylacridone to be acted upon by hydrazine hydrate in the presence of pyridine and at a temperature of about 90–100° C.

In testimony whereof I have hereunto set my hand.

ALBERT JOB.